Jan. 1, 1952 — F. M. LE COMPTE — 2,581,193
METHOD OF FORMING DAMPING STRUCTURES
Filed Oct. 19, 1948 — 3 Sheets-Sheet 1
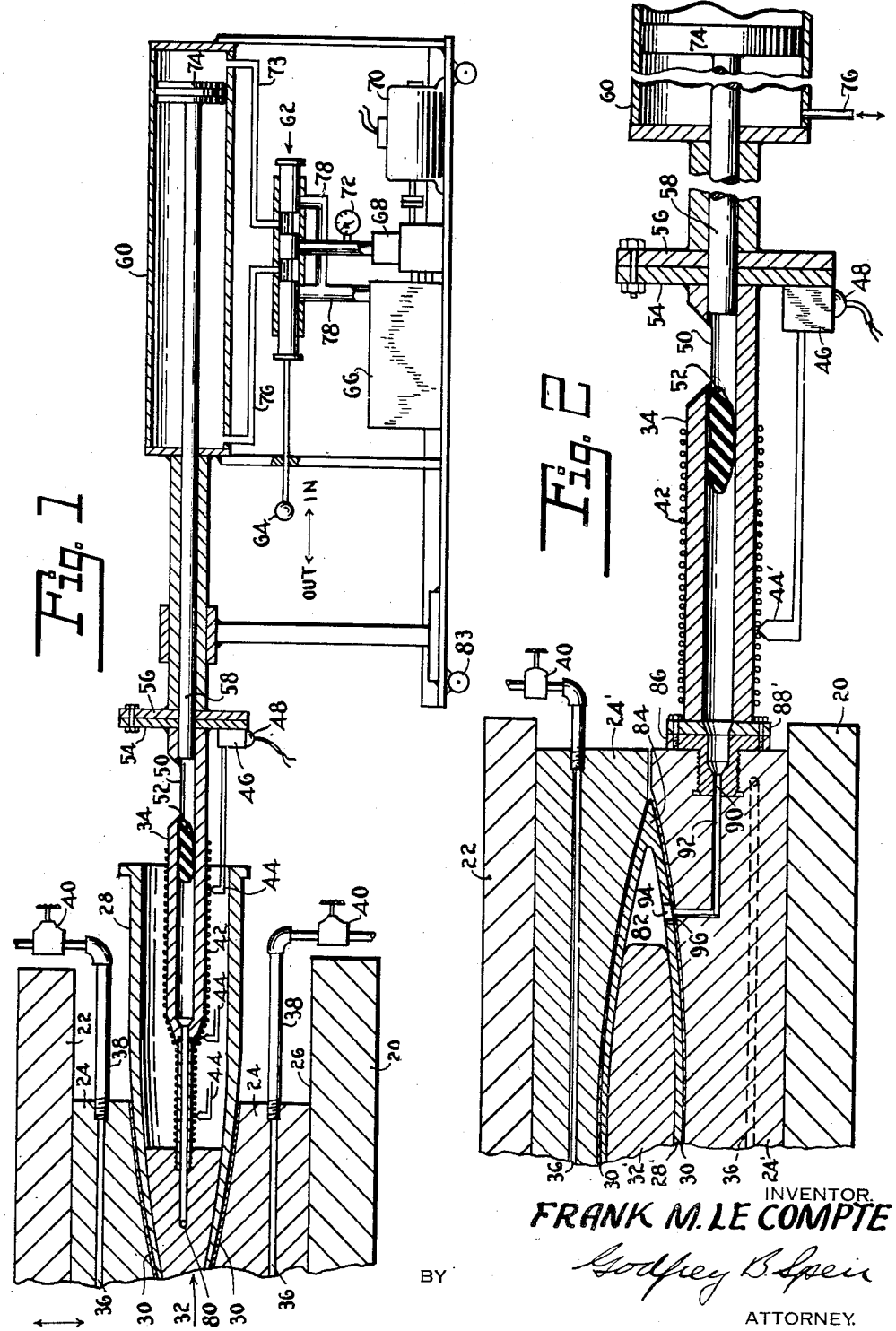
INVENTOR.
FRANK M. LE COMPTE
BY Godfrey B. Spein
ATTORNEY.

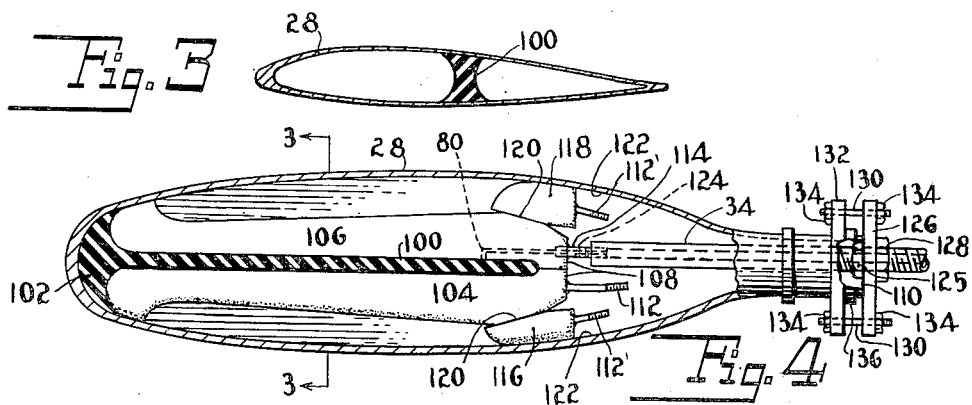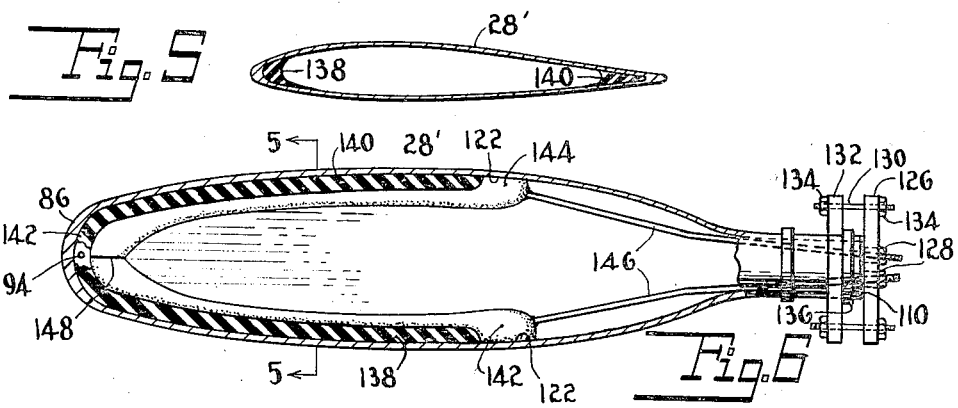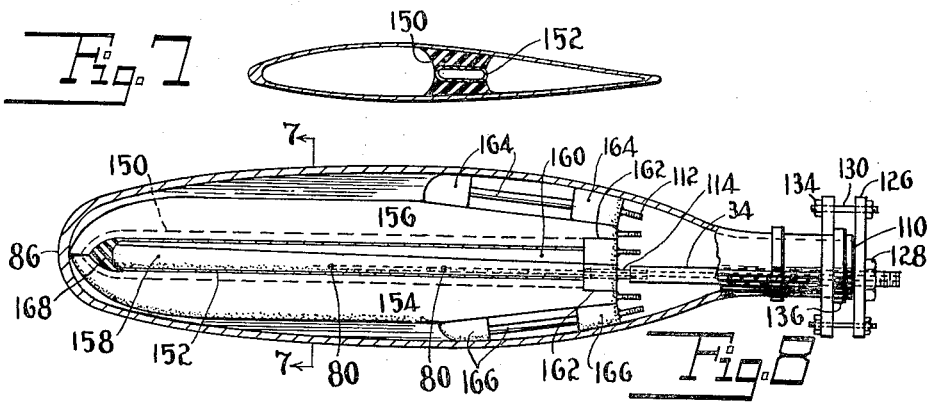

Jan. 1, 1952 — F. M. LE COMPTE — 2,581,193
METHOD OF FORMING DAMPING STRUCTURES
Filed Oct. 19, 1948 — 3 Sheets-Sheet 3
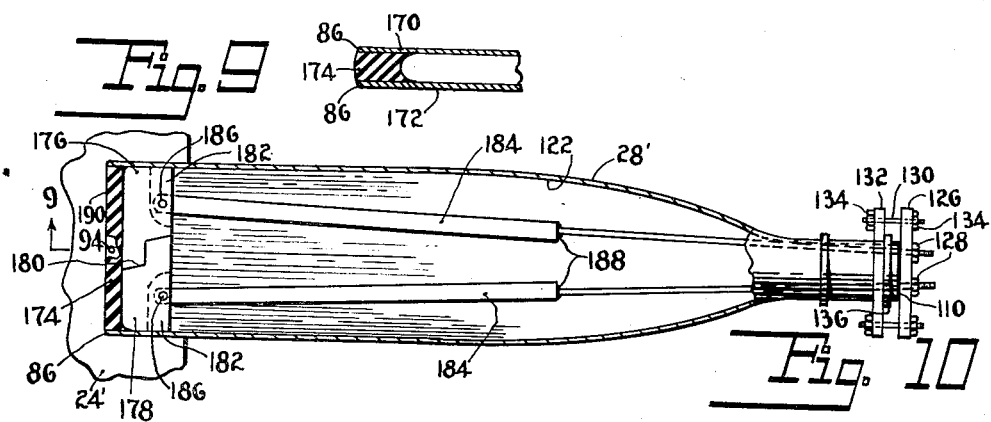
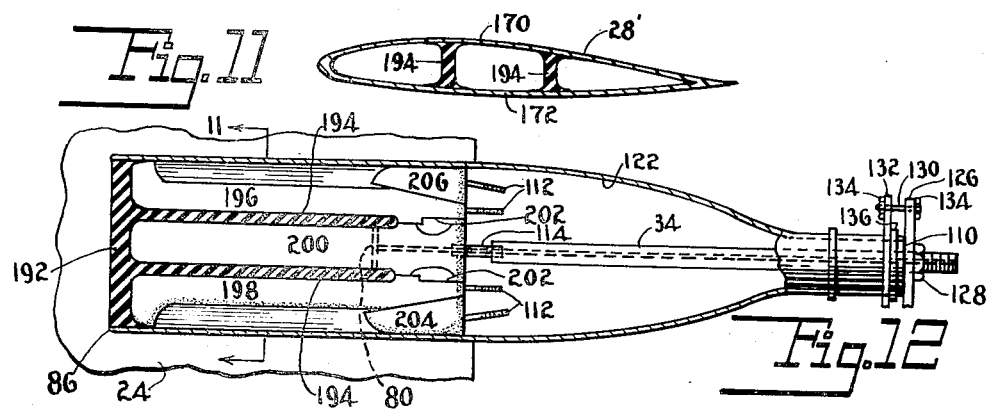
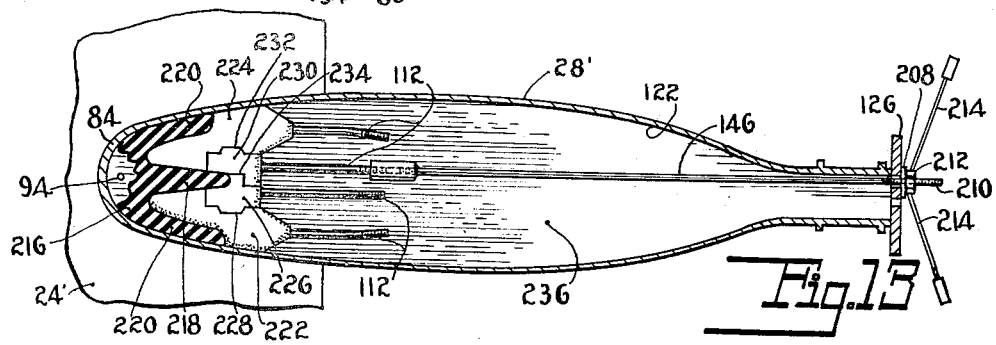
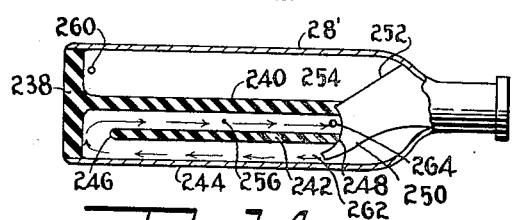
INVENTOR.
FRANK M. LE COMPTE
ATTORNEY.

Patented Jan. 1, 1952

2,581,193

UNITED STATES PATENT OFFICE 2,581,193

METHOD OF FORMING DAMPING STRUCTURES

Frank M. Le Compte, Chatham, N. J., assignor to Curtiss-Wright Corporation, a corporation of Delaware Application October 19, 1948, Serial No. 55,264

2 Claims. (Cl. 18—59)

This invention relates to methods of rubber injection into a hollow propeller blade or the like to produce rubber ribs or fillets in the blade for vibration damping and stiffening effects, and in some instances, to produce a rubber tip whereby thrust and camber plates of the blade are secured to one another.

This invention pertains particularly to the injection and bonding of a plastic material in a hollow metallic propeller blade or the like. It has been learned that plastic (such as rubber when bonded in a propeller blade) will damp vibrations and relieve high stress concentrations due to vibration, within the blade, resulting from varying operational conditions. The plastic used in the blade may be any one of the thermo-setting or thermo-softening varieties available or combinations thereof, or of other age-setting or pressure-setting materials or the like, including as an example, raw natural or synthetic rubber with a bonding agent added thereto which has an affinity for the surface within the blade, such surface being, for instance, chemically clean steel, brass plating or the like. The plastic or rubber best suited is that which is solid and not of the porous variety with elastic properties making it capable of assuming predictable stresses at predictable strains. This enables imposition of stresses on the rubber and the blade with predictable stress distribution therebetween.

Suitable rubber configurations for a hollow steel blade, for instance, may include a full rubber tip, a full rubber tip joined by longitudinal ribs, a rubber tip joined by a center rib and leading and trailing fillets, a rubber rib with a metal tube therein, rubber ribs terminating short of the tip, tip and leading and trailing fillets or some variation of the above mentioned to suit the requirements of a particular blade design.

To install the rubber, the blade interior surface is treated so as to offer the best bonding qualities for the raw rubber. Mandrel elements are then passed through the shank of the blade, corelated within the blade and locked to form a cavity into which rubber may be injected. All mandrels are so designed so as to form generous fillets where the rubber bonds to the blade material. The blade is then placed in a heated holding die for purpose of preventing the blade from bulging when injection pressures are applied and the heat keeps the rubber soft during injection. An injection nozzle is then fitted to a passage in one of the mandrels leading to the cavity formed thereby. A ram passes within the nozzle to force a rubber charge placed in the nozzle into the blade cavity. The nozzle is temperature controlled to allow the rubber to become soft while being injected. After the cavity is filled, the temperature of the holding die is elevated, curing the rubber. The nozzle is then removed, the blade is taken out of the die, the mandrels are extracted through the shank and the blade and rubber structure are permitted to cool.

In all the various embodiments of mandrel assemblies, mandrel elements are passed singly through the narrow shank opening of the completely fabricated hollow metallic propeller blade. The mandrel units are then assembled within the blade and after injection of the rubber are disassembled and extracted again through the shank.

Objects of the invention are: to produce any desired rubber insert configuration within a hollow propeller blade; to provide a method of obtaining the desired internal rubber configuration; and to obtain a vibration damping and stiffening action in a propeller blade by the proper selection of internal rubber configuration for any particular blade design. Further objects will become apparent from a reading of the following detailed specification.

Reference may be made first to the attached drawings in which similar reference numerals refer to similar parts throughout the several views and in which:

Fig. 1 is a broken sectional view showing means to inject rubber into a propeller blade, through the shank, and including an injecting ram;

Fig. 2 is a broken sectional view showing means to inject rubber into a propeller blade through the tip;

Fig. 3 is a sectional view of a propeller blade taken on line 3—3 of Fig. 4;

Fig. 4 is a planform view of a propeller blade with one plate thereof partially removed and including a rubber rib;

Fig. 5 is a sectional view of a propeller blade taken on line 5—5 of Fig. 6;

Fig. 6 is a planform view of a propeller blade with one plate thereof partially removed and including rubber fillets;

Fig. 7 is a sectional view of a propeller blade taken on line 7—7 of Fig. 8;

Fig. 8 is a planform view of a propeller blade with one plate thereof partially removed and including an alternative rubber rib;

Fig. 9 is a sectional view of a propeller tip taken on line 9—9 of Fig. 10;

Fig. 10 is a planform view of a propeller blade with one plate thereof partially removed and including a rubber tip;

Fig. 11 is a sectional view of a propeller blade taken on line 11—11 of Fig. 12;

Fig. 12 is a planform view of a propeller blade with one plate thereof partially removed and including a rubber tip and rib arrangement;

Fig. 13 is a planform sectional view of a propeller blade including an alternative internal rubber arangement; and Fig. 14 is a planform sectional view of a propeller blade showing an alternative rubber configuration.

The metal-to-rubber bonding process suitable for use in bonding rubber within hollow steel propeller blades, to be described, is what is generally termed "brass plated bond" by those familiar with the art. The metal is first brass plated and then rubber is vulcanized to the brass. Due to a chemical affinity between the rubber compound and the copper constituent of the brass, a rubber-brass interlayer is formed during vulcanization to produce the basic bonding agent. Other phenomena are believed to be present to make this bond effective. The zinc constituent of the brass is an important element for it controls or inhibits the bonding reaction rate and develops a sharp gradient in the bonding interlayer and preserves the bond of the brass plating to the steel. In the electro-plating of a brass of the proper copper-zinc ratio and to attain a proper amount of deposit within the hollow steel blade, special methods have been required and developed but these form no part of the present invention.

Brass plate bond has advantages over other bonding methods in applying a rubber structure within a long thin cavity of a propeller blade since the wiping action of the rubber during injection does not adversely affect the brass plating, whereas it tends to destroy a surface tension type cements if employed. Brass plate bond has additional advantages in high temperature stability and resistance to shock loads. There is, however, a requirement for very close processing control if these advantages are to be fully realized.

In electro-plating the walls of a blade cavity, the anode is limited in size to that which may pass through the blade shank opening. The resulting small anode area lowers plating efficiency and under these conditions, it is necessary continuously to circulate electrolyte within the blade cavity. After plating, the plated surface is brushed gently with steel wool and then flushed with cold water followed by a steam-air dry. The plating is then inspected for coverage and color.

It is important that the time interval between plating and rubber injection be less than eight hours and, in any case, plating must be inspected immediately before injection to be certain that no appreciable amount of oxide has formed.

Reference may now be made to Figs. 1 and 2 which illustrate preferred equipment used to accomplish the injection of rubber into a hollow steel propeller blade, or the like, in accordance with the principles of this invention.

A press 20 is provided with a vertically movable ram 22, and matched die halves 24 are fastened therein, the lower portion of the die being fixed to a bed 26 while the upper portion of the die is movable with the ram 22 to permit work entry therein. A blade 28 is placed between the die halves after having had a sheet gasket 30 fastened thereon to allow for irregularities between the blade and die, and a set of mandrels 32 assembled therein, one of the mandrels having an injection nozzle 34 secured thereto. The die is provided with passages 36 to which steam pipes 38 are fitted to enable heating same. After the assembly of blade, gasket, mandrels, and injection nozzle in the die, the ram is lowered closing the die. The closed die will prevent blade distortion when the rubber is injected into the blade under high pressure. Steam is then valved, as at 40, to the die passages 36 to heat the die, and by conduction, to heat the blade. The die is brought to and held at a temperature of approximately 230° F. for injection.

The injection nozzle 34 is wound with resistance wire 42 through which electric current is passed to heat the nozzle. In Fig. 1, which shows a setup for injection through the shank end of the blade, the nozzle is provided with three separate heating coils as indicated by the location of the thermocouples 44. The temperature at each of these locations is held at a suitable temperature of the order of 150° F. The leads from the thermocouples are led out through the shank and are connected to a terminal block 46 which is provided with a tap 48 and thence to a recording instrument (not shown) so that deviations from correct temperatures may be observed and correction applied.

A rubber charge 52 is passed into the cylinder forming part of the nozzle 34, through an opening 50, for injection into the blade. The rubber used is uncured and is compounded and prepared for injection in a standard rubber mill which creates the desired plastic injection consistency. The nozzle 34 is provided with a face plate 54 which carries the aforesaid terminal block 46. This face plate acts as a locater and coupler, when bolted to a similar plate 56, for a ram piston 58 which drives the rubber 52 into the blade.

The ram piston 58 is carried and actuated by a hydraulic system consisting of a cylinder 60, a slide valve 62, a valve lever 64 used to actuate said valve, and an oil sump 66 provided with a pump 68 and driven by a motor 70; an oil pressure gage 72 is connected to the delivery end of the pump. When the lever 64 is moved to the left, as shown, pressure oil from the pump charges the cylinder 60 through the line 73, thus driving the piston 74 leftwardly as shown causing the injection ram 58 to do likewise. Moving the lever to the right, as shown, charges the left end of the cylinder 60 through line 76 causing the piston to retract, the oil from the low pressure side of the cylinder passing through line 73 and thence through the scavenge line 78 back to the sump. The mechanical advantage preferably is such that about 350 p. s. i. (pounds per square inch) oil pressure develops about 8000 p. s. i. injection pressure. The injection pressure may be varied according to the type of blade being worked.

The plastic rubber is rammed through the injection nozzle 34 as noted above into the mandrel 32 which is provided with a cross filler hole 80 leading to a cavity 82 (Fig. 2) between the mandrel 32 and the blade 28. After a sufficient amount of rubber is injected into the blade to fill the blade cavity, a pressure responsive switch at the extremity of the cavity being filled is tripped by the rubber under pressure producing a signal to indicate filling of the cavity, whereupon no more rubber is injected. Ram pressure is held, however, so as to prevent the rubber from backing out of the blade and the temperature of the die is then elevated to the order of 290° F. for a period of the order of forty-five minutes for curing the rubber. The curing temperature and timing varies according to the rubber composition and the mass of rubber used.

After curing, the lever 64 is shifted causing the ram 58 to withdraw from the nozzle 34. The face plates 54 and 56 are unbolted and the hydraulic unit is withdrawn, the unit being mounted on casters 83. The ram 22 of the press 20 is raised causing the die to open. The blade 28 is removed from the die and permitted to cool. After cooling, the injection nozzle 34 is removed from the mandrel 32 and the mandrel 32 is withdrawn from the blade 28 leaving only the rubber bonded to the inside of the blade.

Fig. 2 employs the same injection system described above. However, the arrangement of the injection nozzle 34' is slightly different in that one coil is sufficient for heating, and one thermocouple 44' is used to sense its temperature. Injection in this scheme is being performed through the blade tip 84 rather than through the shank end as in Fig. 1. Securement of the nozzle 34' to the die 24' is accomplished through the screw plug 86 which acts as a reducer end for the nozzle and offers a face plate to which a nozzle flange 88 may be bolted. The reduced orifice 90 of the screw plug nozzle 86 coincides with a passage 92 in the die 24'.

The tip of the propeller blade 28' is provided with a filler hole 94 which, when the blade is placed in the die, encircles the die passage as at 96. It will be noted the filler hole 94 in the blade 24' is larger in diameter than that of the hole 92, the object being to allow the rubber, when injected, to enter the cavity 82 rapidly. After sufficient internal pressure has been developed, the blade plate is pressed against the die, and is sealed against rubber leakage. The after injection procedure follows a pattern similar to that described in connection with Fig. 1.

The magnitude of the various process values utilized in the injection procedure, above set forth, including pressures, temperatures, electrolyte flow rates and plating E. M. F. are for purpose of describing a particular embodiment and therefore may vary accordingly as blade sizes and shapes, rubber composition, bonding technique, and rubber mass and confiuration may vary. Taking this into consideration, it should be understood that the specific values quoted in no way should limit the scope of the invention.

Reference may now be made to Figs. 3 and 4, which show one rubber configuration including a rib 100 and a tip 102, defined by the insertion of preshaped mandrels 104 and 106 through the shank end of the blade 28. Proper location of the mandrels in the blade is established by measuring the distance from the ends 108 of the mandrels 104 and 106 to the end of the shank 110. Studs 112 and 114 provide a means by which the mandrels are led into the shank, the studs having threads thereon to which is screwed a detachable positioning bar (not shown in Figs. 3 and 4, but shown in Fig. 13 at 146). Wedge mandrels 116 and 118 are then driven into place by detachable positioning bars secured to the studs 112. Acting through the taper 120 and the inner edge of the blade 122 they tend to jam the entire unit into position. The injection nozzle 34 is then screwed to stud 114 through which there is a passage 124 so that rubber may be injected from the nozzle through the stud into the mandrel, thence out of the hole 80 into the cavity formed by and between the mandrels 104, 106 and the blade 28. In order to prevent the entire mandrel unit from collapsing and being forced out by the internal pressures developed by the injected rubber, the nozzle 34 is fitted with nuts 125 and 128 which embrace a plate 126. The plate 126 has a number of holes therein to accommodate studs, 130, the other ends of which are inserted into a split plate 132 embracing the blade shank, the studs being fitted with nuts 134 on both ends thereof, which when tightened hold the split plate 132 against the blade shank retaining flange 136 and the plate 126 against the end of the shank 110. It will be apparent that any force applied to the mandrels by the injected rubber which would tend to urge said mandrels apart or from the desired relation with respect to each other will be canceled by the portion of the nozzle 34, within the blade, acting as a reinforcing strut. The nozzle, bearing on the nut 125, studs 130, and split plate 132 which butts against the blade retention flange 136, is thereby restricted from movement. Each of the following alternative arrangements embody a somewhat similar mandrel retention means. The mandrels are fabricated from aluminum or other appropriate material to facilitate light, easy handling and to avoid bonding of the rubber thereto, the rubber bonding only being effective on the treated inner surfaces of the steel blade.

The mandrels are removed after injection of the rubber by removing the nuts 134, split plate 132, studs 130, nuts 125 and 128, plate 126 and the injection nozzle 34, leaving only the mandrels within the blade. The aforementioned positioning bar 146 is passed through the shank opening and screwed to the stud 112 of either wedge mandrel 116 or 118 (as best indicated with regard to other mandrel arrangements in Fig. 13). The plate 126 is then passed over the positioning bar and permitted to float free thereon. A large washer 208 is then slipped on the positioning bar, the outside diameter of which is sufficiently large to prevent passing through the hole in plate 126. The end of the positioning bar extending out of the shank is provided with an external thread 210 over which is screwed a nut 212 with a pair of wing handles 214 thereon. Referring again to Fig. 4, by taking up on the nut either wedge mandrel 116 or 118 is removed. After both wedge mandrels are extracted, mandrel 104 may be withdrawn in a similar fashion. Finally, by means of an adapter on the end of the positioning bar to fit the stud 114, mandrel 106 is removed.

The positioning bar 146 is used to position the various mandrels or to withdraw the mandrels as above described. Mandrels may be removed in other ways, such as by a hydraulic arrangement or by power driven mechanical means. Therefore, the means of extraction above described should not in any way limit the scope of the invention.

It may be noted that in Fig. 1 no mandrel retention means is provided, the reason for this being that in the case where a single longitudinal rubber rib terminating short of the blade tip is desired, the mandrel arrangement may be such that the injection forces equalize themselves, making retention means unnecessary.

Reference may now be made to Figs. 5 and 6 in which Fig. 5 shows a section view of the propeller blade 28' taken on line 5—5 of Fig. 6, and shows a rubber fillet 138 on the inside leading edge and a rubber fillet 140 on the inside trailing edge of the blade. Fig. 6 indicates that the rubber fillet in both leading and trailing edges is connected by a tip fillet 142. In the figure a small section of rubber is broken away at the tip section 86 uncovering the filler hole 94 for purpose of description. The tip mode of injection is employed as illustrated in Fig. 2. For this particular configuration of rubber only two mandrels 142 and 144 are required, these being provided with fixed positioning and puller bars 146. This mandrel assembly becomes self-supporting, the mandrels proper making contact with each other as at 148 and engaging the inside edges of the blade 122. They are held in position through the bars 146 by nuts 125 (not shown) which bear against the pate 126, butting against the shank end 110 as previously described in connection with Fig. 4. Pressures exerted on the mandrels, due to rubber injection pressure, jam said mandrels against the bars 146 restricting any movement thereof within the blade.

Figs. 7 and 8 show still another configuration of a rubber rib structure. In this embodiment a rubber rib 150 extends longitudinally down the center portion of the blade and terminates short of the tip 86. Inside the rib is a metal tube 152, oval in cross-section, extending the length of the rib for the purpose of stiffening and lightening. The rubber rib is formed by shankwise injection as the presence of the injection nozzle 34 indicates. Mandrels 154 and 156 are inserted through the shank, the tube 152 is placed over additional mandrels 158 and 160 and this tri-unit 152, 158 and 160 is then inserted between the mandrels 154 and 156. The position of mandrels 158 and 160 is held by their fitting engagement with a keyed step in mandrels 154 and 156 as indicated by 162. Lastly, the wedge mandrels 164 and 166 are driven into position.

Rubber injection is accomplished by having holes in the tube 152 to match with the cross-filler holes 80 in the mandrel 158. A curved cavity defined by the ends of mandrels 158 and 160 produce an outer end seal for the tube as at 168.

Figs. 9 and 10 represent an embodiment whereby rubber is employed to seal and form an end closure for a square tipped propeller blade. The tip 86 of the blade 28' is left open when fabricated, the camber plate 170 and the thrust plate 172 not being secured to one another. Through the rubber injection process already described, the plates 170 and 172 may be bonded together as exemplified by the rubber tip fillet 174. To obtain the rubber configuration 174, mandrel 176 is first inserted and turned into position, and mandrel 178 is introduced, turned, and keyed to mandrel 176 as at 180. It will be noted that each mandrel has a cavity 182 milled therein into which is inserted a flat rod 184 pivotally pinned as at 186. This arrangement enables swivelling the mandrels on their respective rods 184 for easy insertion, turning and extraction thereof. Positioning and puller rods 146 are welded to the flat rods 184, as indicated at 188, so that securing of the mandrels as heretofore described may be realized. This embodiment employs the die 24' not only to confine the blade, as heretofore mentioned, but also to form the end wall of the mold cavity, to restrain the rubber injected into the cavity as at 190. The rubber injection technique for this configuration follows the pattern outlined in Fig. 2.

Figs. 11 and 12 show a rubber tip 192 integral with longitudinal ribs 194. The rubber is confined at the tip 86 by the die 24 following the pattern of Fig. 10. However, shankwise injection is preferred here, making for simplification of mandrels. Mandrels 196 and 198 are first inserted, being followed by the injection mandrel 200 keyed to the foregoing mandrels as at 202. Wedge mandrels 204 and 206 are then driven into position jamming the entire mandrel unit with the propeller blade.

Fig. 13 shows a rubber configuration wherein the tipwise mode of injection is followed. This particular configuration provides a rubber tip fillet 216 integral with a center rib 218 and leading and trailing fillets 220. The mandrel arrangement includes leading and trailing edge mandrels 222 and 224 respectively. A keying mandrel 226 is keyed to 222 as at 228 and a keying mandrel 230 is keyed to 224 as at 232, and are likewise keyed to each other as at 234. The mandrels are inserted through the shank individually and are keyed together within the wide portion of the propeller blade in the zone indicated at 236. The positioning bar 146 is then secured on the stud 112 of the mandrel 230 as shown and the entire mandrel unit is driven into place and secured at the blade shank.

Fig. 14 shows a propeller blade 28' with a full rubber tip 238 and longitudinal center rib 240 plus an additional longitudinal rubber rib 242 located between the center rib 240 and the leading edge 244. This rib terminates short of the tip 238 as at 246 and extends shankward terminating outboard thereof as at 248. This arrangement lends itself to a propeller equipped for heated air de-icing, and is provided with additional elements described below.

A nozzle 250 is inserted through the shank and secured therein with its outlet directed toward the leading inside edge of the blade. A rear portion of the nozzle structure 252 forms a closure for the trailing inside portion of the blade as at 254 isolating same from the leading portions 256 and 262. A tip breather hole 260 is provided in the trailing portion 254 to vent this cavity. The nozzle 250 is interconnected with a heat exchange unit (not shown) from which hot gas is expelled and led through a conduit to the nozzle 250 from which it is emitted to the leading cavity 262. The hot gas is then forced along the leading edge cavity 262 toward the tip, as indicated by the arrows, thence around the tip 246 of rib 242 and between said rib and the center rib 240 into the aforementioned cavity 256 to pass out to the atmosphere through the escape hole 264. The ribs in this particular embodiment in addition to damping vibrations and stresses in the blade provide, by masking portions of the blade, passages through which hot gas may be passed to relieve the blade of ice accumulations formed thereon during flight operations.

Heating the leading edge of a propeller blade for purpose of removing ice is disclosed and claimed in a copending application, Serial No. 647,248, for Propeller Blade Anti-Icing Means, filed February 13, 1946 by Charles W. Chillson and Everett P. Palmatier and assigned to the same assignee as the present invention, Patent No. 2,510,170.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. The method of forming supporting and damping structure of plastic material in a hollow steel propeller blade having an access opening at one end only which comprises: preparing the inner surface of the blade to receive a structure forming plastic including a bonding agent; inserting within the blade through said access opening a plurality of interengageable, cavity defining mandrels to form a preshaped cavity within the blade; preheating the blade and cavity forming mandrels; simultaneously heating and injecting under pressure the raw plastic into the preshaped cavity within the blade; applying additional heat thereto, after injection, for curing the plastic; and finally extracting the cavity forming mandrels from the blade through said access opening, and cooling the blade and plastic.

2. The method of forming supporting and damping structure of plastic material in a hollow steel propeller blade having an access opening at one end only which comprises: preparing the inner surface of the blade to receive a structure forming plastic including a bonding agent; inserting within the blade through said access opening a plurality of interengageable, cavity defining mandrels to form a preshaped cavity within the blade; preheating the blade and cavity forming mandrels; simultaneously heating and injecting under pressure the raw plastic into the preshaped cavity within the blade; curing the raw plastic to convert it to a structural plastic material; and finally extracting the cavity forming mandrels from the blade through said access opening.

FRANK M. LE COMPTE.

REFERENCES CITED

The following references are of record in the file of this patent:

UNITED STATES PATENTS

| Number | Name | Date |
|---|---|---|
| 866,114 | Dean | Sept. 17, 1907 |
| 1,068,654 | Hinds | July 29, 1913 |
| 2,226,938 | McCarthy | Dec. 31, 1940 |
| 2,315,394 | Brosius | Mar. 30, 1943 |
| 2,411,398 | Wallace | Nov. 19, 1946 |